US008633987B2

(12) United States Patent
Deschamp

(10) Patent No.: US 8,633,987 B2
(45) Date of Patent: Jan. 21, 2014

(54) VIDEO PROCESSING SYSTEM PROVIDING IMAGE PATTERN DETECTION BASED UPON IMAGE TRANSITION BOUNDARIES AND RELATED METHODS

(75) Inventor: Joseph Deschamp, Schwenksville, PA (US)

(73) Assignee: HBC Solutions, Inc., Englewood, CO (US)

( * ) Notice: Subject to any disclaimer, the term of this patent is extended or adjusted under 35 U.S.C. 154(b) by 1339 days.

(21) Appl. No.: 12/023,354

(22) Filed: Jan. 31, 2008

(65) Prior Publication Data

US 2009/0195658 A1    Aug. 6, 2009

(51) Int. Cl.
*H04N 17/02* (2006.01)
*H04N 3/02* (2006.01)

(52) U.S. Cl.
USPC ............................ 348/184; 348/182; 348/189

(58) Field of Classification Search
USPC ................................. 348/180–184, 189–191
See application file for complete search history.

(56) References Cited

U.S. PATENT DOCUMENTS

| | | | |
|---|---|---|---|
| 4,951,128 A | 8/1990 | Miyake | 358/31 |
| 5,475,428 A * | 12/1995 | Hintz et al. | 348/263 |
| 5,532,756 A | 7/1996 | Nishikawa et al. | 348/630 |
| 5,872,592 A * | 2/1999 | Manea et al. | 348/181 |
| 6,219,094 B1 | 4/2001 | Gerlach et al. | 348/184 |
| 6,285,396 B1 * | 9/2001 | Har Shoshanim et al. ... | 348/180 |
| 6,487,360 B1 | 11/2002 | Sumiyoshi et al. | 386/52 |
| 6,992,696 B1 * | 1/2006 | Albertelli | 348/188 |
| 2004/0066981 A1 * | 4/2004 | Li et al. | 382/286 |
| 2006/0203125 A1 * | 9/2006 | Sayre | 348/459 |

OTHER PUBLICATIONS

Tektronix Video Signal Generators, SPK600-SPG300, Tektronix, Inc., 2004.
The Color Bars Signal—Why and How, Tektronix, Inc., available at www.tek.com.

* cited by examiner

*Primary Examiner* — Jason J Chung
(74) *Attorney, Agent, or Firm* — Tarolli, Sundheim, Covell & Tummino LLP

(57) ABSTRACT

A video processing system may include an input for receiving video data including video signal values for a corresponding plurality of image pixels and having an image pattern therein. The system may further include a processor coupled to the input for determining a series of video signal value differences for each pair of adjacent image pixels along at least one direction, detecting at least one image transition boundary based upon the series of video signal value differences, and detecting the image pattern based upon the at least one image transition boundary.

19 Claims, 8 Drawing Sheets

US 8,633,987 B2

VIDEO PROCESSING SYSTEM PROVIDING IMAGE PATTERN DETECTION BASED UPON IMAGE TRANSITION BOUNDARIES AND RELATED METHODS

FIELD OF THE INVENTION

The present invention relates to the field of video processing systems, and, more particularly, to video image pattern detection systems and related methods.

BACKGROUND OF THE INVENTION

Test patterns are sometimes included in a video signal for calibrating or troubleshooting the downstream signal path. The test patterns are typically generated by test signal generators, and they allow vendors, viewers and television stations to adjust their equipment for desired functionality. By way of example, such test patterns may include an eight vertical color bar pattern, as well as the slightly more complex Society of Motion Picture and Television Engineers (SMPTE) color bar pattern. Such patterns may also be used to indicate that there is a problem or error with the signal feed, or they may be used to indicate the beginning or end of a signal feed.

Accordingly, when processing broadcast video data it may often be desired to detect the presence of such test patterns to ensure the accuracy of a received video data. However, this task has traditionally been performed manually, which can be cumbersome and relatively time consuming for video editors.

Various approaches have been developed for automatically determining video signal attributes for different purposes. For example, U.S. Pat. No. 4,951,128 discloses a method for detecting correlation of a video signal having a chrominance component by combining three successive line intervals of the video signal to produce a first signal by obtaining the sum of the video signals of those three line intervals, combining at least two of those three line intervals to produce a second signal by obtaining the difference between the video signals of such two line intervals. The method further includes detecting the absolute values of the first and second signals, respectively, and determining the difference between the absolute values of the first and second signals to produce a correlation indication signal.

Despite the existence of such approaches, further developments may be desirable to provide automated pattern recognition of test or other patterns in video data.

SUMMARY OF THE INVENTION

In view of the foregoing background, it is therefore an object of the present invention to provide a system and related methods for more readily identifying patterns within video data.

This and other objects, features, and advantages are provided by a video processing system which may include an input for receiving video data including video signal values for a corresponding plurality of image pixels and having an image pattern therein. The system may further include a processor coupled to the input for determining a series of video signal value differences for each pair of adjacent image pixels along at least one direction, detecting at least one image transition boundary based upon the series of video signal value differences, and detecting the image pattern based upon the at least one image transition boundary.

Accordingly, the system may advantageously detect one or more image patters, such as from among a plurality of different image patterns. By way of example, such image patterns may include a color bar pattern, pillar box pattern, letter box pattern, flat field pattern, single color frame pattern, etc. The processor may also generate an output identifying the image pattern from among the plurality thereof.

The processor may determine the series of video signal value differences for each pair of adjacent (e.g., directly adjacent) image pixels along a horizontal image direction and/or a vertical image direction. The image pattern may include a fixed image pattern over a plurality of image frames or fields. Additionally, the video signal values may include at least one of luminance and chrominance values.

The processor may further advantageously determine whether the video data exceeds a blurriness threshold based upon the at least one image transition boundary. By way of example, the processor may determine whether the video data exceeds the blurriness threshold based upon determining a magnitude of the at least one image transition boundary and comparing the magnitude to a blurriness threshold magnitude. A memory may also be coupled to the input and the processor for storing the video data.

A related video processing method is for video data including video signal values for a corresponding plurality of image pixels and having an image pattern therein. The method may include determining a series of video signal value differences for each pair of adjacent image pixels along at least one direction. Moreover, the method may further include detecting at least one image transition boundary based upon the series of video signal value differences, and detecting the image pattern based upon the at least one image transition boundary.

DETAILED DESCRIPTION OF THE PREFERRED EMBODIMENTS

Figure 1:
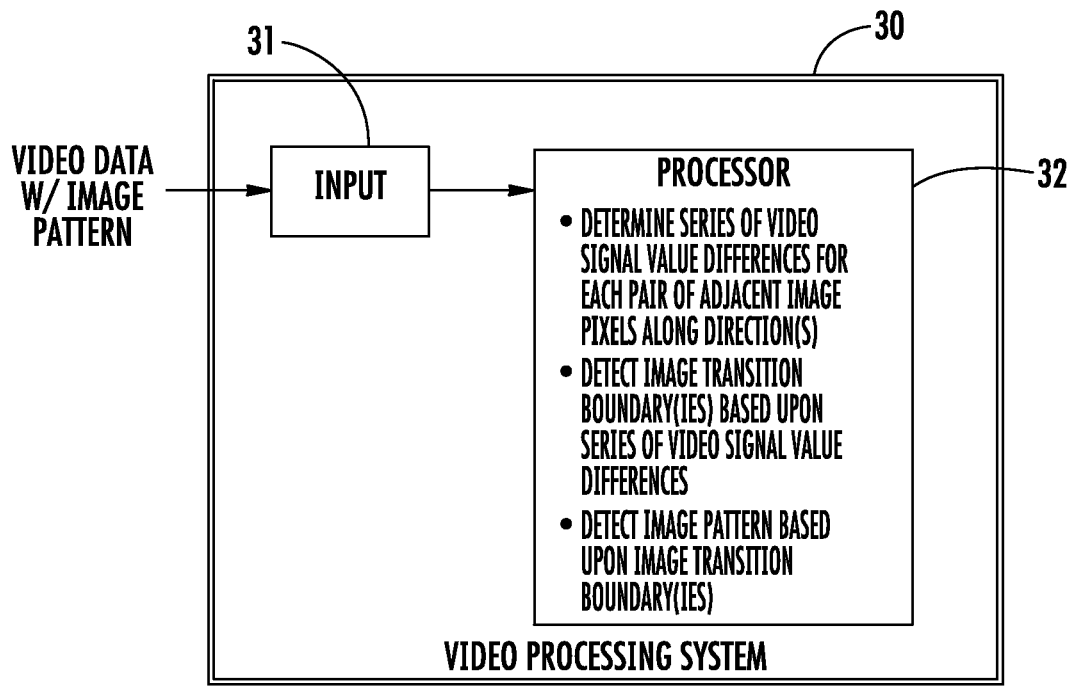
FIG. 1 is a schematic block diagram of a video processing system in accordance with the invention.
Figure 2:
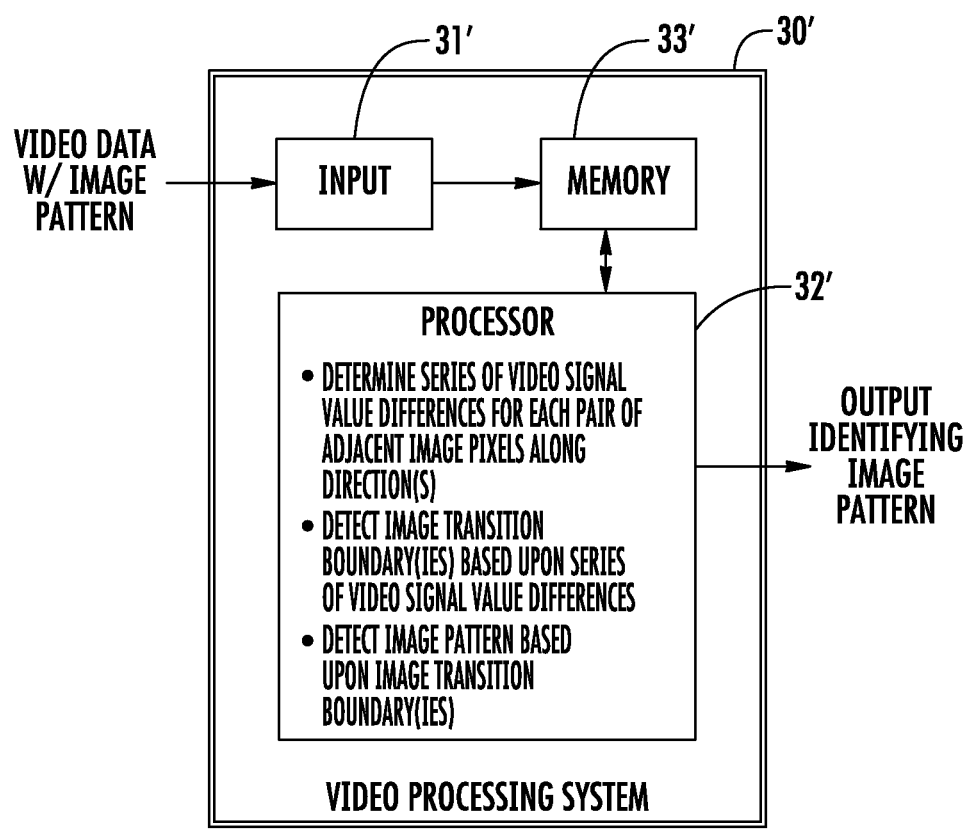
FIG. 2 is a schematic block diagram of an alternative embodiment of the video processing system of FIG. 1.
Figure 3:
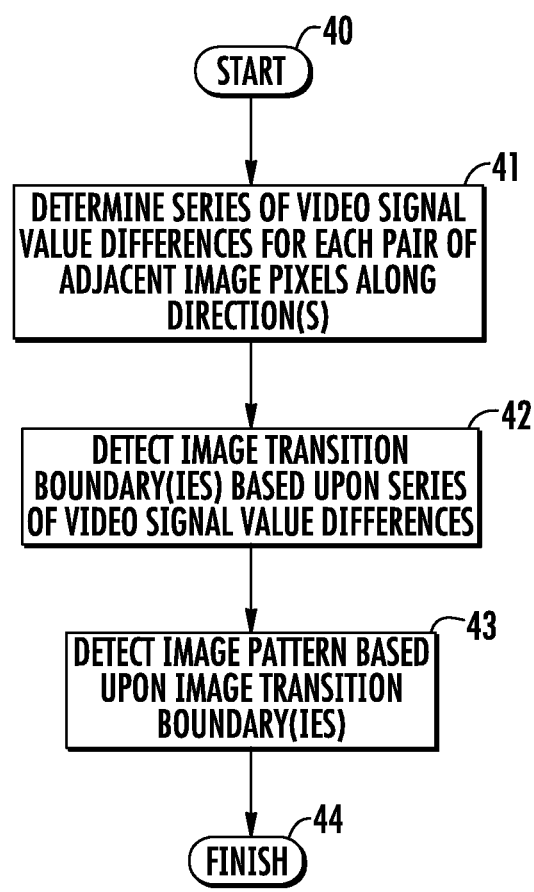
FIGS. 3 and 4 are flow diagrams illustrating video processing method aspects of the present invention.
Figure 4:
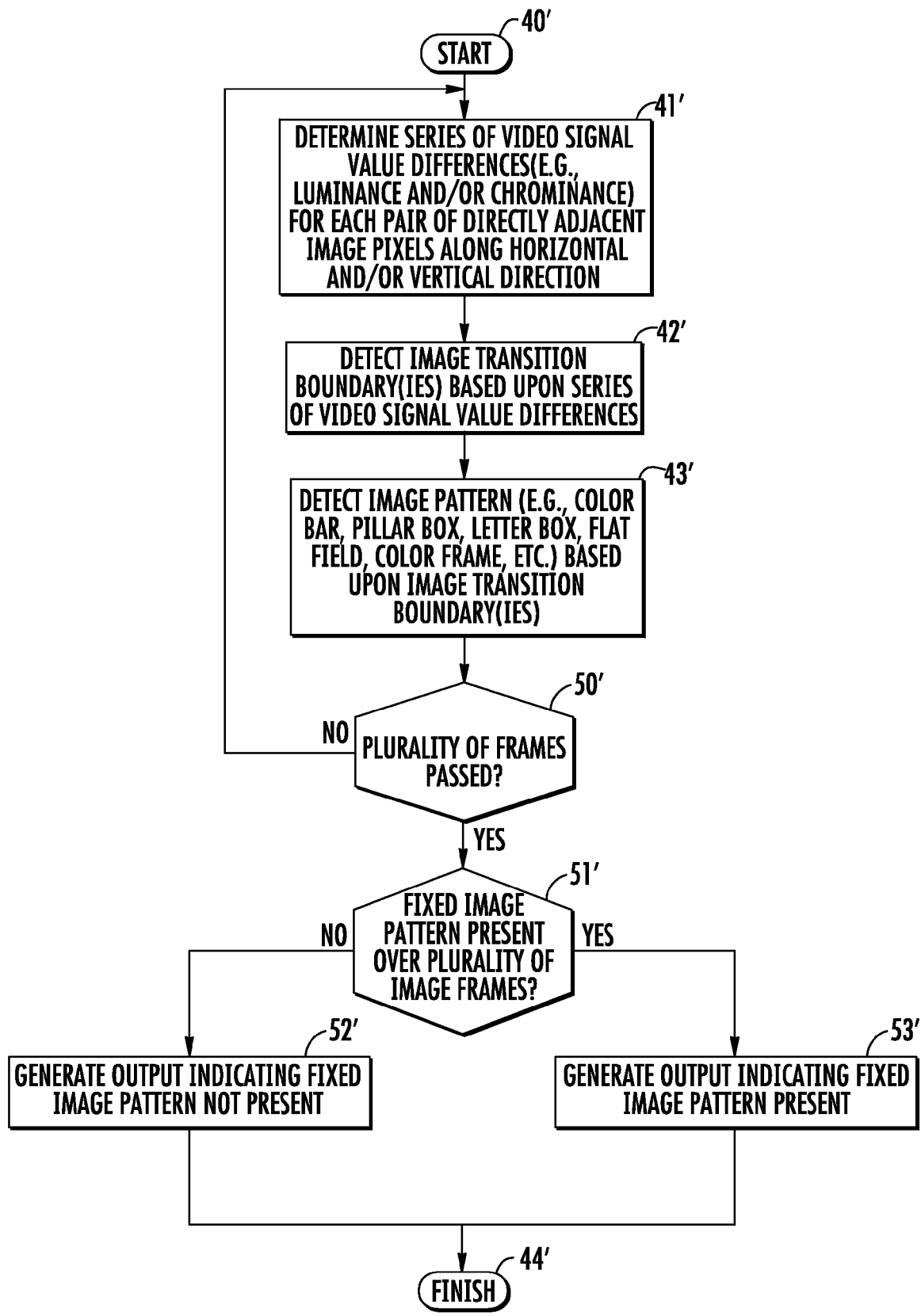

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Referring initially to FIGS. 1 through 4, a video processing system 30 and corresponding method aspects are first described. The system 30 illustratively includes an input 31 for receiving video data including video signal values for a corresponding plurality of image pixels. By way of example, the video may be a digital video made up of frames of image pixels. The signal may be generated in digital form, or it may be a digitized analog signal (e.g., NTSC, etc.). The system 30 may be used with both interlaced and non-interlaced signals, as will be appreciated by those skilled in the art. Moreover, it should be noted that pixel values may be compared at the field or the frame level.

As discussed briefly above, video signal feeds in some instances will have an image pattern therein. In some cases the pattern may occupy most if not all of a video frame, such as in the case of color bar patterns. In other cases, the pattern of interest may occupy less than the entire screen or frame area, such as in the case of a letter or pillar box, as well as a flat field. Other examples include "watermarks" that are continuously displayed for some or all of a program duration. For example, such watermarks may include semi-transparent station or network logos.

It may be desirable to detect the presence of such patterns for a variety of reasons. For example, it may be desired to ensure that a given pattern is present in a played-out video feed (e.g., it has the proper water mark, it is formatted appropriately with letter box/pillar box, it begins or ends with an appropriate color bar pattern, etc.). On the other hand, there may be situations where the presence of a pattern indicates a problem, such as a color bar pattern suddenly appearing during a video feed, for example, in which case it would be desirable to detect the existence of the problem without having to manually review a large video data set.

To this end, the processor 32 is illustratively coupled to the input and is for determining a series of video signal value differences for each pair of adjacent image pixels along at least one direction, at Blocks 40-41. More particularly, the video signal values may be luminance and/or chrominance values for corresponding pixels, and each pair of pixels may be directly adjacent image pixels taken along horizontal and/or vertical directions (e.g., rows and/or columns), at Block 41'. The processor 32 may therefore detect image transition boundaries within the image based upon the series of video signal value differences, at Block 42, and therefore detect the image pattern based upon the image transition boundary or boundaries, at Block 43, thus concluding the method illustrated in FIG. 3 (Block 44). More particularly, based upon the number and/or location of luminance/chrominance transition boundaries, the processor 32 can determine whether a particular image pattern is present, and optionally whether the image is located correctly within the frame.

The image pattern may include a fixed image pattern over a plurality of image frames or fields, and the processor 32 may advantageously detect the fixed image pattern. That is, the processor 32 may check to see that the image pattern remains fixed for a plurality of frames (such as in the case of a watermark, letter/pillar box, etc.), as intended, at Blocks 50'-51'. However, it should be noted that it may not be necessary to check for the occurrence of a pattern over multiple frames in all embodiments, i.e., in some applications detection of an image pattern within a single frame may be sufficient. Moreover, frames need not be checked in consecutive order, i.e., every other frame, every $10^{th}$ frame, etc., could be checked for the presence of the pattern to advantageously conserve processing resources, as will be appreciated by those skilled in the art. If a desired pattern is not present as expected, an output may be generated indicating same, at Block 52', or, alternatively, indicating that the desired image pattern is present, at Block 53'.

In addition, the output may indicate which of a plurality of different image patterns is present in the video data, such as those noted above. Moreover, in certain circumstances the output may take the form of an alert for the operator, especially in the case where a pattern is unexpected and is indicative of a problem with the video data (e.g., color bars appearing within the video where they are not supposed to be).

Figure 5:
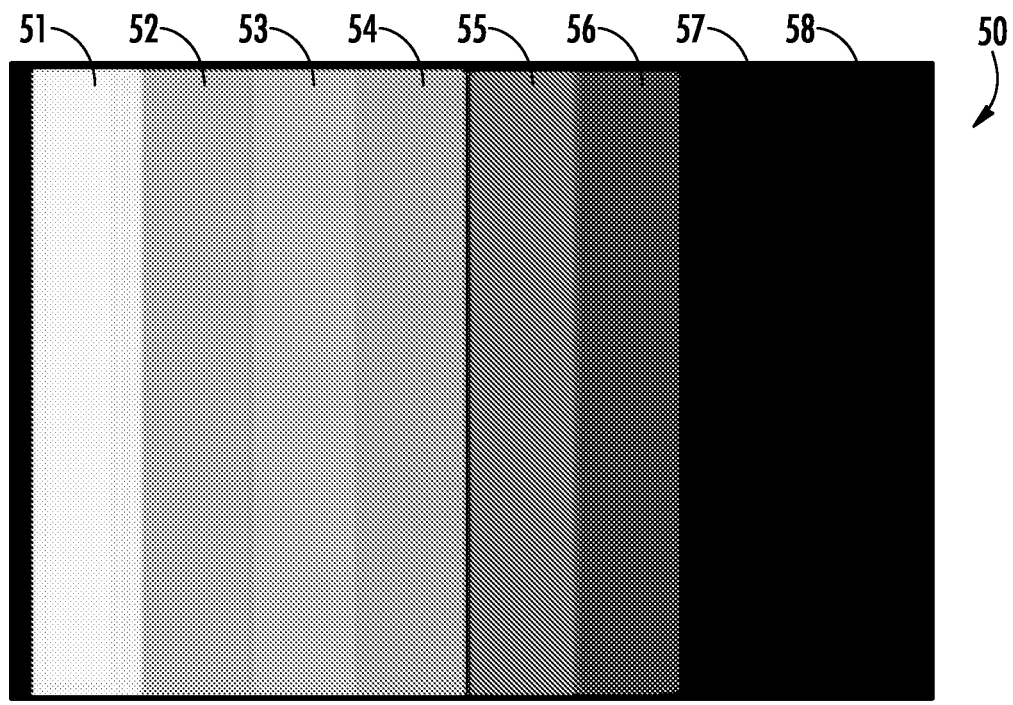
FIG. 5 is a video frame including a solid color bar pattern to be detected by the system of FIG. 1.
Figure 6:
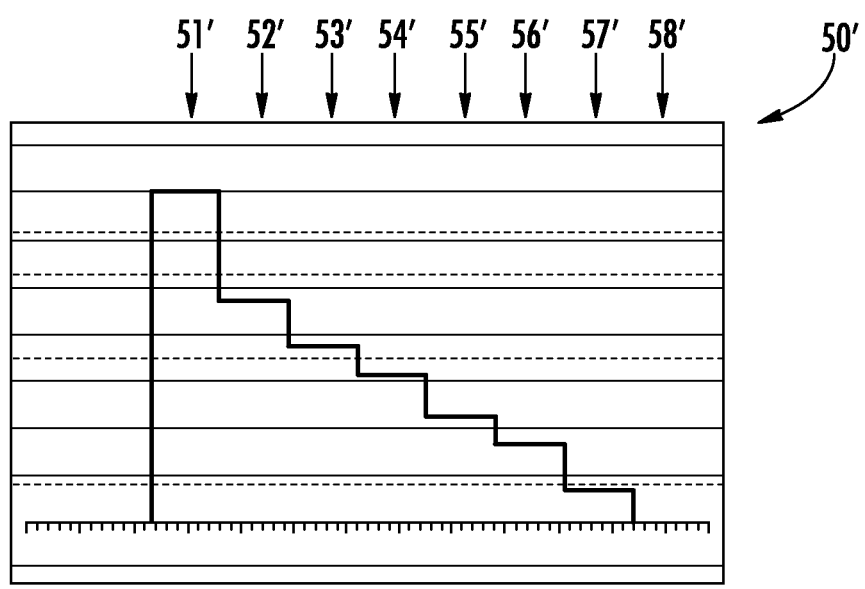
FIG. 6 is a graph of luminance magnitudes for the video frame of FIG. 5 showing transition boundaries therein.
Figure 7:
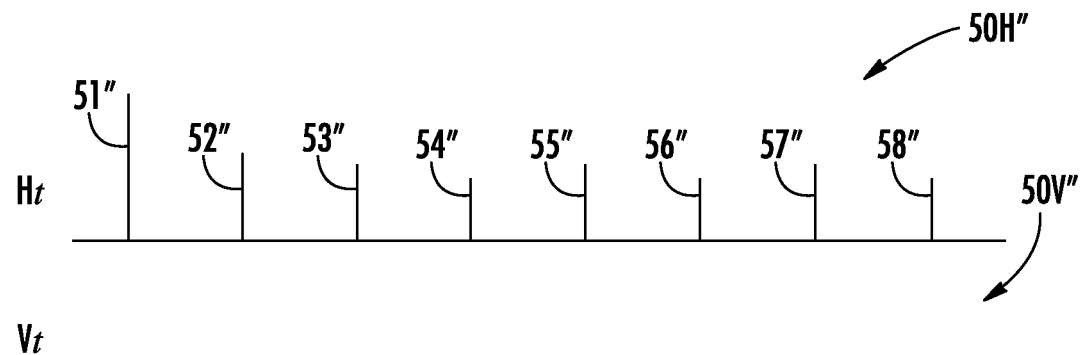
FIG. 7 is a plot of horizontal and vertical boundary transition magnitudes for the video frame of FIG. 5.

Turning now additionally to FIGS. 5-7, the foregoing will be further understood with reference to an example in which a color bar pattern including eight vertical bars of solid colors which are, from left to right, a white color bar 51, a yellow color bar 52, a cyan color bar 53, a green color bar 54, a magenta color bar 55, a red color bar 56, a blue color bar 57, and a black color bar 58. In the present example, the processor 32 monitors both vertical and horizontal transitions in a frame, but in some embodiments one may be monitored without the other depending upon the particular patterns to be detected, as will be appreciated by those skilled in the art.

If the processor 32 detects that the frame includes no or minimal vertical transitions, but that it does include eight distinct or "strong" horizontal transitions, then the processor determines with a high degree of likelihood that the frame contains an eight-bar color pattern. In this regard, the processor 32 may compare the detected transitions to a known reference pattern, such that if expected transitions occur within a threshold magnitude and/or location within the frame, then the presence of the color bar image is detected.

More particularly, vertical transitions may be calculated by comparing the difference in luminance (and/or chrominance in some embodiments) between the same pixels across two consecutive lines or rows. Then, the absolute value of the difference is taken and the result accumulated for the same x location across all lines of the frame as follows:

$$Vt(y) = \Sigma abs(p(x, y-1) - p(x, y)), \quad (1)$$

for x=1 to a number of pixels in the line.

Similarly, horizontal transitions may be calculated by comparing the difference in luminance between the same pixels across two consecutive pixels in the same line. Then, the absolute value of the difference is taken and the result accumulated for the same y location across all pixels in the line as follows:

$$Ht(x) = \Sigma abs(p(x-1, y) - p(x, y)), \quad (2)$$

for y=1 to a number of lines in frame. Preferably, Vt is calculated for all x locations in the frame (number of pixels in a line), and Ht is calculated for all Y locations in the frame (number of lines in a frame), although all locations need not necessarily be checked in all embodiments depending upon the given image pattern that is being checked for (e.g., a watermark may only require checking in a lower corner of the frame).

The corresponding luminance plot 50" for the eight color bar pattern 50 is shown in FIG. 6, and the corresponding Ht and Vt plots 50H" and 50V" are respectively shown in FIG. 7. In these figures, the various color bar luminance levels and magnitudes are indicated with the same reference numeral used in FIG. 5, but with prime and double prime notation, respectively. As may be seen, there are eight distinct transitions in the solid color bars. Due to the fact that all lines in the exemplary frame are identical, the Ht plot has eight distinct transitions 51"-58" (seen as impulses in FIG. 7), while Vt has no transitions since all of the lines will be identical (i.e., all pixels in each column have the same luminance values, so the sum of their differences will be zero).

Figure 8:
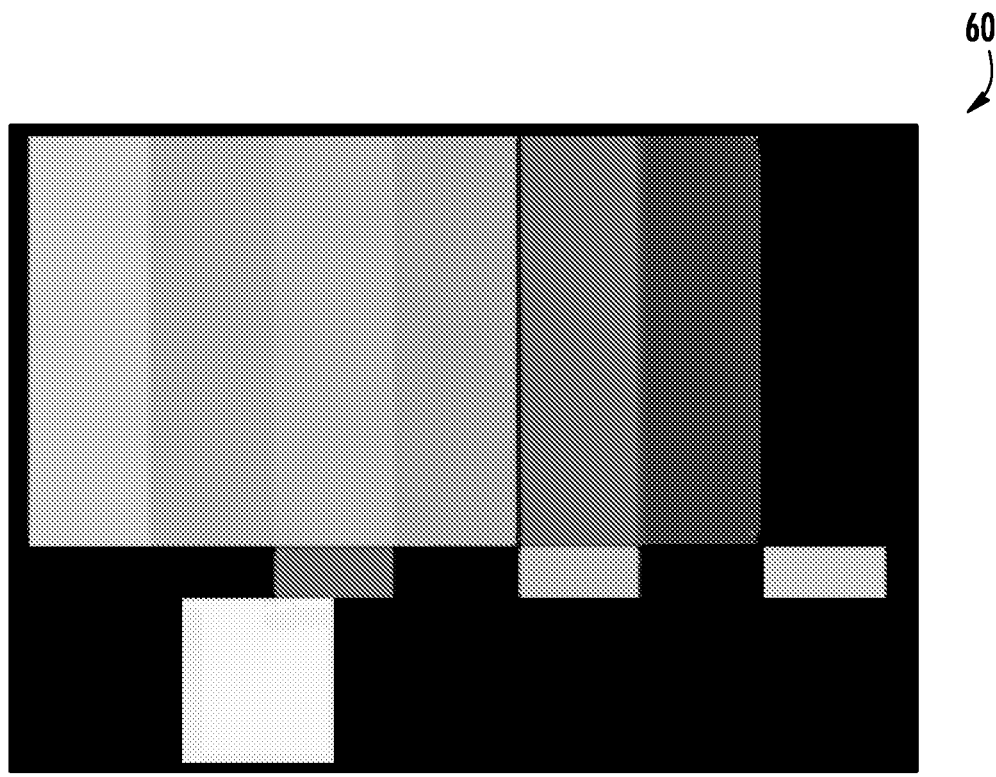
FIG. 8 is a video frame including an SMPTE solid color bar pattern to be detected by the system of FIG. 1.
Figure 9:
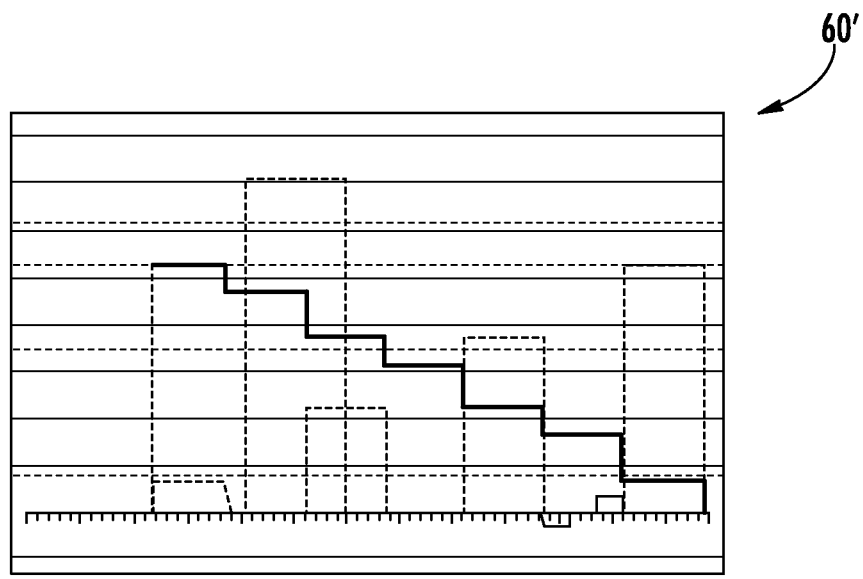
FIG. 9 is a graph of luminance magnitudes for the video frame of FIG. 8 showing transition boundaries therein.
Figure 10:
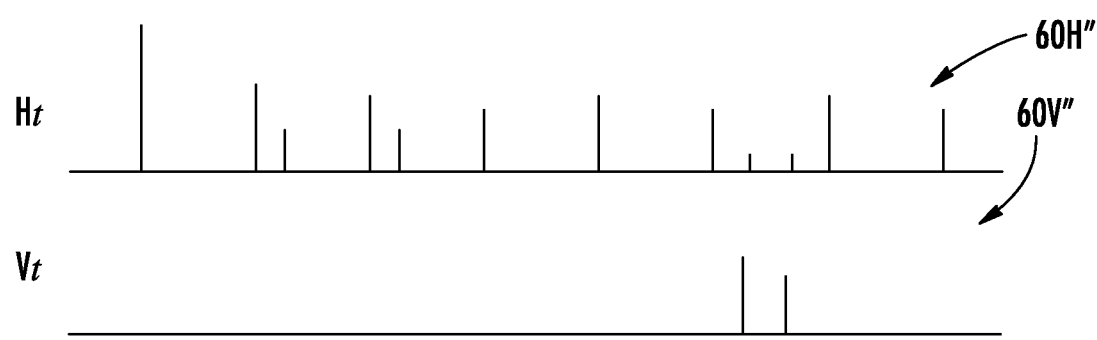
FIG. 10 is a plot of horizontal and vertical boundary transition magnitudes for the video frame of FIG. 8.

Referring now additionally to FIGS. 8-10, another image pattern detection example is provided for an SMPTE color bar pattern 60. The corresponding luminance graph 60' shows that there are eight major transitions in the SMPTE color bars, but also that there are other minor transitions as well. The corresponding Ht and Vt plots 60H" and 60V" are shown in FIG. 10. Since there are vertical transitions in this pattern as well, the magnitude plot for Vt is not flat as in the prior example. Again, the values plotted in FIG. 10 are obtained using formulas (1) and (2) above, although other formulations may be possible in other embodiments.

Figure 11:
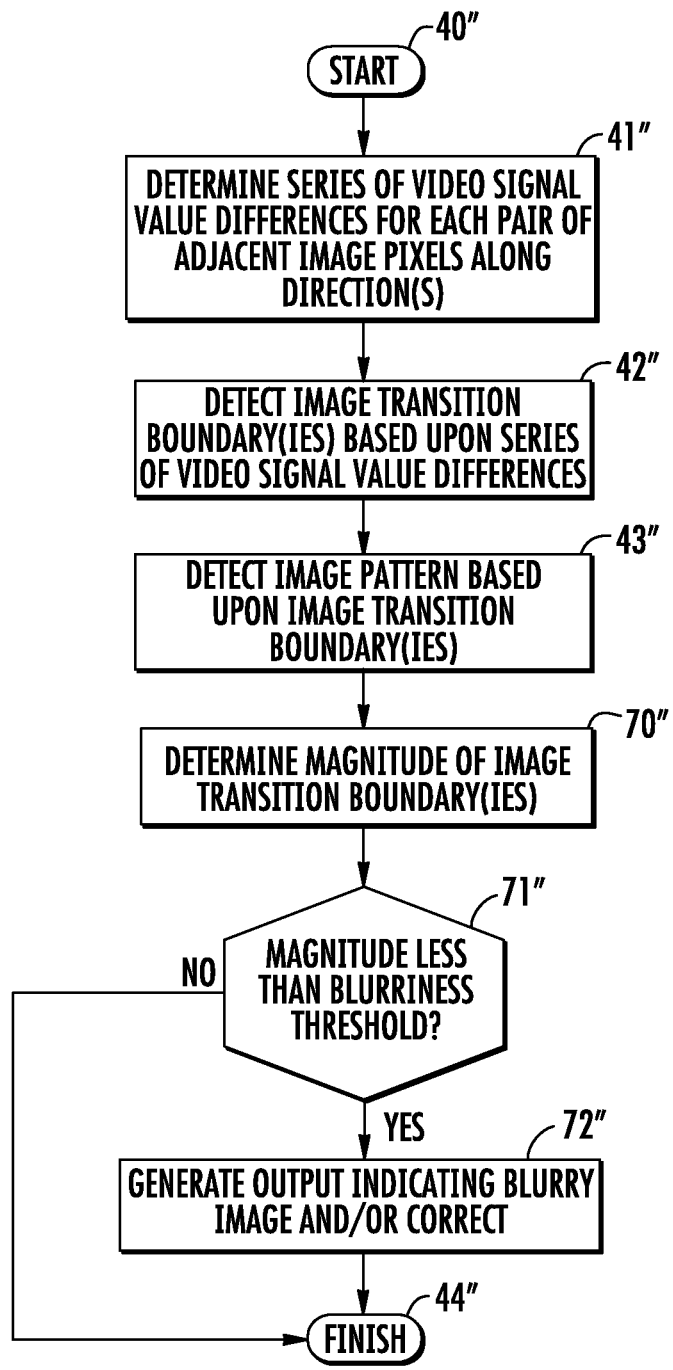
FIG. 11 is a flow diagram illustrating blurriness detection method aspects of the present invention.
Figure 12:
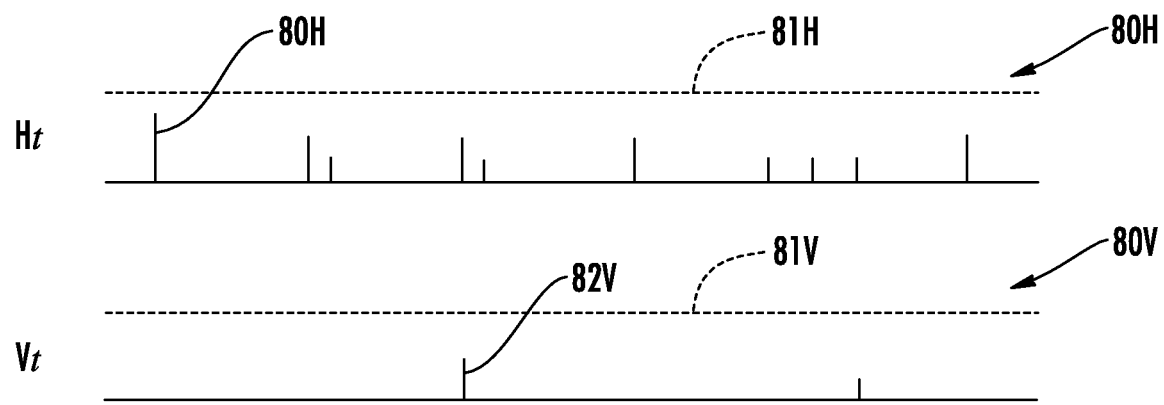
FIG. 12 is a plot of horizontal and vertical boundary transition magnitudes showing blurriness detection in accordance with the method of FIG. 11.

Turning now to FIGS. 11 and 12, upon determining the above-noted transition boundaries within an image, the boundaries may also advantageously be used for detecting blurriness of the image. Generally speaking, a blurry image will not have a sharp contrast, or transition, between different colors in the image. Taking the example of FIG. 12 where Ht and Vt plots 80H, 80V are shown for a blurry image, upon determining the magnitude of image transition boundaries within a given image frame, at Block 71' (e.g., using equations (1) and (2), above), the processor 32 may then determine whether the magnitude(s) exceed a respective blurriness threshold 81V, 81H. It should be noted that these thresholds 81V, 81H may be different in some embodiments, or they may be the same.

In accordance with one example, the greatest or maximum transition values (i.e., the largest Ht and Vt magnitude values 82H and 82V) are compared with the blurriness thresholds 81V, 81H, and if both (or just one, depending on the given implementation) of these values is not above its respective threshold then the image is determined to be a blurry image. If this is the case, then the appropriate output/alert may be generated, and corrective action may be taken in some embodiments, by the processor 32, as will be appreciated by those skilled in the art. However, other approaches for comparing the Ht and/or Vt values to the threshold may be used, as will be appreciated by those skilled in the art. Also, different blurriness thresholds may be used depending upon the given implementation and video type, as will also be appreciated by those skilled in the art.

In some embodiments, it may be desirable to not only count the transitions, but to also apply a threshold to exclude minor transitions as well as noise in the video, as will further be appreciated by those skilled in the art. As noted above, the Ht and Vt calculations may also advantageously be used to detect various other image patterns, such as pillar boxes, letter boxes, flat fields, and black (or other color) frames.

In particular, for a pillar box the beginning and end values of Ht will be minimal values, and the active area in between will change with content. For a letter box, the beginning and end values of Vt will be of minimal value, and the active area in between will change with content. For flat fields, there will be two transitions from blanking to flat field and back to blanking for both Vt and Ht. A black frame will have no significant transitions in either Vt or Ht. Once again, other unique shapes such as watermarks, etc., may also be determined or detected using this approach, as will be appreciated by those skilled in the art Referring additionally to FIG. 2, an alternative embodiment of the system 30' illustratively includes a memory 33' for storing received video data prior to processing by the processor 32'. By way of example, the system 30' may be implemented as a media analysis server used to process video data "offline," i.e., not in real time, during the production and editing process. One exemplary media analysis server in which the above-described features may advantageously be implemented is the Videotek® QuiC™, media analysis server from the Harris Corporation, Assignee of the present application. However, the above-described techniques may be implemented using other platforms, and may also be performed on real-time or live broadcast video data. In this regard, it should be noted that reference to a "processor" herein may include both hardware and software components, including discrete components as well as microprocessors and associated memories, as will be appreciated by those skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A video processing system comprising:
    an input for receiving video data comprising video signal values for a corresponding plurality of image pixels and having an image pattern therein, wherein the plurality of pixels form a plurality of frames with an unknown image; and
    a processor coupled to said input and configured to, without manual review of the video signal values, at least
        calculate a series of difference values between video signal values for each pair of adjacent image pixels along at least one direction,
        detect at least one image transition boundary based on the series of difference values;
        detect the image pattern based upon the at least one image transition boundary, wherein the image pattern comprises a given image pattern of a plurality of different image patterns;
        generate an output identifying the given image pattern of the plurality of image patterns; and
        determine whether the video data exceeds a blurriness threshold based upon determining a magnitude of the at least one image transition boundary and comparing the magnitude of the at least one image transition boundary to a magnitude of the blurriness threshold.

2. The video processing system of claim 1 wherein said processor is configured to determine the series of difference values for each pair of adjacent image pixels along a horizontal image direction and a vertical image direction.

3. The video processing system of claim 1 wherein said processor is configured to determine the series of difference values for each pair of directly adjacent image pixels along a horizontal image direction.

4. The video processing system of claim 1 wherein said processor is configured to determine the series of difference values for each pair of directly adjacent image pixels along a vertical image direction.

5. The video processing system of claim 1 wherein the image pattern comprises a fixed image pattern over a plurality of image frames or fields; and wherein said processor is configured to detect the fixed image pattern.

6. The video processing system of claim 1 wherein the image pattern comprises a color bar pattern; and wherein said processor is configured to detect the color bar pattern.

7. The video processing system of claim 1 wherein the image pattern comprises at least one of a pillar box pattern, a letter box pattern, a flat field pattern, and a single color frame pattern; and wherein said processor is configured to detect at least one of the pillar box pattern, the letter box pattern, the flat field pattern, and the single color frame pattern.

8. The video processing system of claim 1 wherein the video signal values comprise at least one of luminance and chrominance values.

9. The video processing system of claim 1 further comprising a memory coupled to said input and said processor and configured to store the video data.

10. The video processing system of claim 1, wherein the image pattern is a semi-transparent image pattern encompassing a proper subset of a set of pixels that form a given frame of the plurality of frames.

11. A video processing system comprising:
a memory for storing video data comprising video signal values for a corresponding plurality of image pixels and having an image pattern therein, wherein the plurality of pixels form a plurality of frames with an unknown image; and
a processor coupled to said memory and configured to, without manual review of the video signal values, at least
calculate a series of difference values between video signal values for each pair of adjacent image pixels along a horizontal image direction and a vertical image direction,
detect at least one image transition boundary based upon the series of difference values,
detect the image pattern based upon the at least one image transition boundary, wherein the image pattern is a given image pattern of a plurality of different image patterns;
generate an output identifying the given image pattern of the plurality of image patterns; and
determine whether the video data exceeds a blurriness threshold based upon determining a magnitude of the at least one image transition boundary and comparing the magnitude of the at least one image transition boundary to a magnitude of the blurriness threshold.

12. The video processing system of claim 11 wherein the image pattern comprises a fixed image pattern over a plurality of image frames or fields; and wherein said processor is configured to detect the fixed image pattern.

13. The video processing system of claim 11 wherein the image pattern comprises a color pattern; and wherein said processor is configured to detect the color bar pattern.

14. The video processing system of claim 11 wherein the image pattern comprises at least one of a pillar box pattern, a letter box pattern, a flat field pattern, and a single color frame pattern; and wherein said processor is configured to detect at least one of the pillar box pattern, the letter box pattern the flat field pattern, and the single color frame pattern.

15. A video processing method for video data comprising video signal values for a corresponding plurality of image pixels and having an image pattern therein, wherein the plurality of pixels form a plurality of frames with an unknown image, the method comprising:
using a processor to, without manual review of the video signal values, at least
calculate a series of difference values between video signal values for each pair of adjacent image pixels along at least one direction,
detecting at least one image transition boundary based upon the series of difference values,
detecting the image pattern based upon the at least one image transition boundary, wherein the image pattern is a given image pattern of a plurality of different image patterns;
generate an output identifying the given pattern of the plurality of image patterns; and
determine whether the video data exceeds a blurriness threshold based upon determining a magnitude of the at least one image transition boundary and comparing the magnitude of the at least one image transition boundary to a magnitude of the blurriness threshold.

16. The method of claim 15 wherein determining the series of difference values comprises determining the series of difference values for each pair of adjacent image pixels along a horizontal image direction and a vertical image direction.

17. The method of claim 15 wherein the image pattern comprises a fixed image pattern over a plurality of image frames or fields; and wherein detecting the image pattern comprises detecting the fixed image pattern.

18. The method of claim 15 wherein the image pattern comprises a color bar pattern; and wherein detecting the image pattern comprises detecting the color bar pattern.

19. The method of claim 15 wherein the video signal values comprise at least one of luminance and chrominance values.

* * * * *